United States Patent [19]

Garner, Sr.

[11] Patent Number: 4,594,752
[45] Date of Patent: Jun. 17, 1986

[54] CABLE OR ROPE CONNECTION INCLUDING CLAMP DEVICE

[76] Inventor: Ronald S. Garner, Sr., P.O. Box 545, Dayton, Ohio 45402

[21] Appl. No.: 660,342

[22] Filed: Oct. 12, 1984

[51] Int. Cl.$^4$ .............................................. F16G 11/00
[52] U.S. Cl. ........................... 24/132 R; 24/132 WL; 24/134 L; 24/270; 403/3; 403/344
[58] Field of Search ...... 24/132 R, 132 WL, 132 AA, 24/133, 135 R, 135 L, 456; 403/344, 3

[56] References Cited

U.S. PATENT DOCUMENTS

| | | | |
|---|---|---|---|
| 532,562 | 1/1895 | Janeway, Jr. et al. | 24/135 L |
| 1,110,011 | 9/1914 | Schneider | 24/270 |
| 1,233,366 | 7/1917 | Keator | 24/134 L |
| 1,413,690 | 4/1922 | Slocum | 24/132 R |
| 1,564,995 | 12/1925 | Allen | 24/132 R |
| 2,112,017 | 3/1938 | Fisher | 403/3 |
| 2,507,093 | 5/1950 | Collings | 403/3 |
| 3,115,688 | 12/1963 | Smith | 24/135 L |
| 3,137,027 | 6/1964 | Birkle | 24/456 |
| 3,201,838 | 8/1965 | Brown | 24/135 R |
| 3,964,774 | 6/1976 | Wollin et al. | 24/270 |
| 4,405,828 | 9/1983 | Shook | 24/135 R |
| 4,493,134 | 1/1985 | Karr | 24/132 R |

Primary Examiner—Victor N. Sakran
Attorney, Agent, or Firm—Biebel, French & Nauman

[57] ABSTRACT

A rope or cable connection is made between first and second lengths of rope or cable by a clamp device including an upper jaw member and a lower jaw member which are hinged together. The upper jaw member defines an open ended engagement slot through which the lengths of cable or rope extend. The jaw members may be pivoted apart to an open position, or alternatively, pivoted together to a closed position. When in the closed position, the open end of the slot is bridged by the lower jaw member and the lengths of rope or cable are compressed within the slot. A latch means holds the upper and lower jaw members in their closed position while permitting quick attachment or disengagement of the clamp device without the need for tools. Slot inserts may also be provided with the clamp device which are dimensioned to be received within the slot. The slot inserts permit cable or rope lengths of different diameters to be clamped together.

17 Claims, 6 Drawing Figures

CABLE OR ROPE CONNECTION INCLUDING CLAMP DEVICE

BACKGROUND OF THE INVENTION

The present invention relates to a connection arrangement for cables or ropes and, more particularly, to a clamp device for connecting together two lengths of cable or rope in a simple secure manner without the need for tools.

Most typically, ropes have been attached together by various types of knots. This has not always provided a sufficiently secure connection. Mechanical rope coupling devices are known, such as the coupling shown in U.S. Pat. No. 3,201,838, issued Aug. 24, 1965, to Brown. The Brown patent discloses a rope connecting device designed for catenary connections which are used in the anchoring systems of air-supported shelters. The Brown rope coupling device, as well as others, such as shown in U.S. Pat. No. 3,115,688, issued Dec. 31, 1963, to Smith, although providing secure connection, are limited by their structure to specific applications. Additionally, known coupling devices have required the use of tools for attachment and detachment.

It is seen, therefore, that there is a need for a simple, effective clamp device which is capable of clamping together two ropes or cables quickly and securely in a convenient fashion without the need for special tools or other apparatus.

SUMMARY OF THE INVENTION

A clamp device for clamping together cables or ropes includes an upper jaw member defining an open ended engagement slot, and a lower jaw member. A hinge means, attaching together the upper jaw member and the lower jaw member, permits the upper and lower jaw members to be pivoted apart to an open position such that the end of the slot is open and ropes or cables may be inserted thereinto. The hinge means permits the upper and lower jaw members to be pivoted together to a closed position such that the end of the slot is bridged by the lower jaw member, thereby retaining the ropes or cables in the slot. A latch means holds the upper and lower jaw members in the closed position.

The hinge means and latch means may be positioned on opposite sides of the slot. The upper jaw member may include a tongue portion which defines the slot, with the slot extending inward from a first arcuate surface. The lower jaw member may define a second arcuate surface which is positioned in close proximity to the first arcuate surface when the upper and lower jaw members are in their closed position.

The latch means may comprise a first latch portion on the upper jaw member, the first latch portion defining a latch groove, and a second latch portion on the lower jaw member. The second latch portion includes a capture sling for engaging the groove to hold the upper and lower jaw members together in the closed position.

The second latch portion may further include lever means pivotally mounted on the lower jaw member and pivotally attached to the capture sling. The lever means is movable between a first position in which the capture sling does not engage the latch groove on the first latch portion, and a second position in which the latch means may engage the latch groove. The lever means in the second position is over center with respect to the capture sling such that a force applied to the capture sling by the first latch portion does not tend to pivot the lever means toward its first position. A spring means is connected to the lower jaw member and to the lever means and urges the lever means toward its second position.

The clamp device further includes a slot insert dimensioned to be received within the open ended engagement slot. The slot insert defines a secondary engagement slot of a height and width less than that of the open ended engagement slot. The slot insert may define a plurality of teeth around the secondary engagement slot. The secondary engagement slot may vary in width to accommodate ropes or cables of differing diameter.

Accordingly, it is an object of the invention to provide a clamp device for gripping cables or ropes which is simple in construction and which provides secure engagement of the cables or ropes; to provide such a clamping device in which the cables or ropes are compressed together; to provide such a clamp device in which different diameters of cables or ropes may be accommodated; and to provide such a device which may be quickly attached to or removed from cables or ropes without the need for tools.

DETAILED DESCRIPTION OF THE PREFERRED EMBODIMENT

Figure 1:
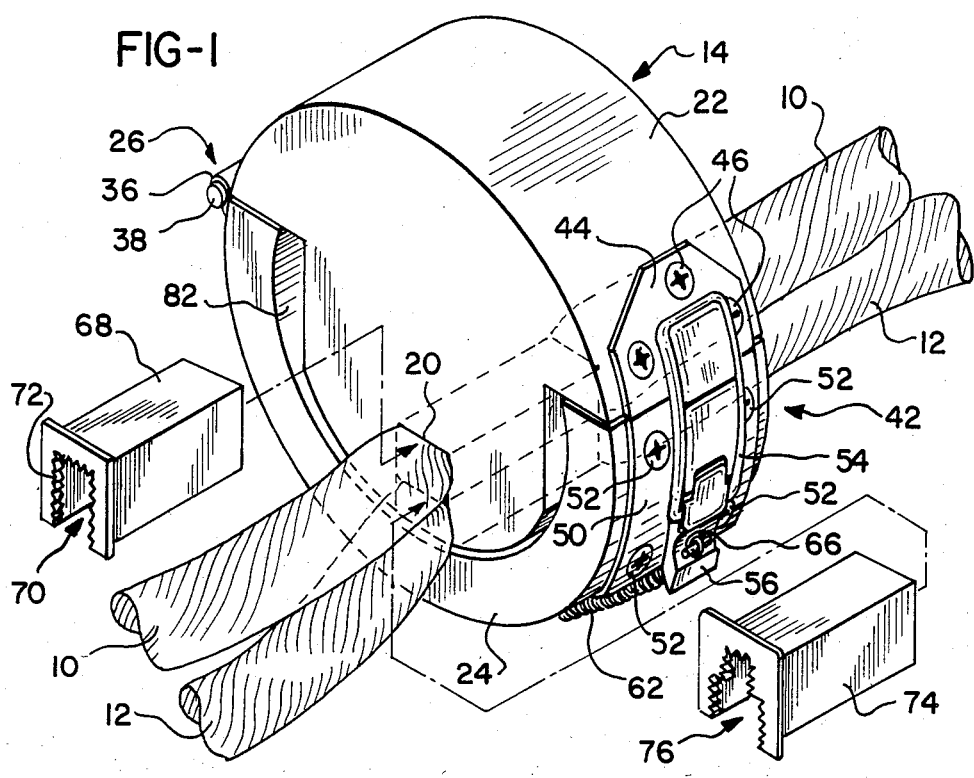
FIG. 1 is a perspective view illustrating the clamp device of the present invention engaging a pair of ropes and, further, illustrating alternate slot insert configurations in exploded fashion.

FIGS. 1–4 illustrate a rope or cable connection by which first and second lengths 10 and 12, respectively, of cable or rope are attached together with clamp device 14, constructed according to the present invention. The clamp device 14 compresses the lengths of cable or rope 10 and 12 from their normal diameters, indicated by dashed lines 16 and 18 in FIG. 4, into a smaller cross sectional area defined by open ended engagement slot 20 in upper jaw member 22. As apparent from FIG. 4, the slot 20 through which the lengths of cable or rope 10 and 12 extend has a width slightly less than the diameter of the lengths of cable or rope 10 and 12, and a height slightly less than twice the diameter of the lengths of cable or rope 10 and 12.

A lower jaw member 24 is attached to the upper jaw member 22 by a hinge means 26. Hinge means 26 includes a lower hinge plate 28 attached to the lower jaw member 24 by screws 30, and an upper hinge plate 32 attached to the upper jaw member 22 by screws 34. Lower hinge plate 28 defines annular portions 36 which engage hinge pin 38. Similarly, upper hinge plate 32 defines annular portion 40 which also engages hinge pin 38. The hinge means 26 attaches together the upper and lower jaw members 22 and 24, respectively, such that they may be pivoted apart to an open position, illustrated in FIG. 5, or pivoted together to a closed position, shown in FIGS. 1–4. In the closed position, the open end of the slot 20 is bridged by the lower member 24.

Figure 4:
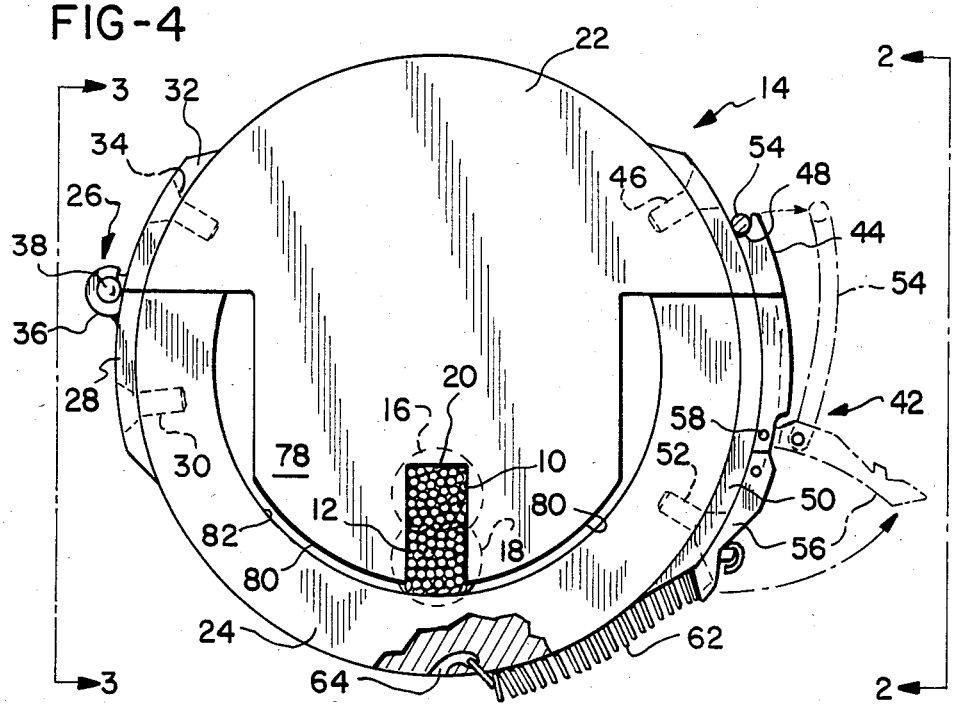
FIG. 4 is a front view of the clamp device of the present invention, with a portion broken away to reveal the attachment slot for the spring to the lower jaw member, the upper and lower jaw members being positioned in their closed positions, and with a portion of the capture sling broken away for purposes of clarity.
Figure 5:
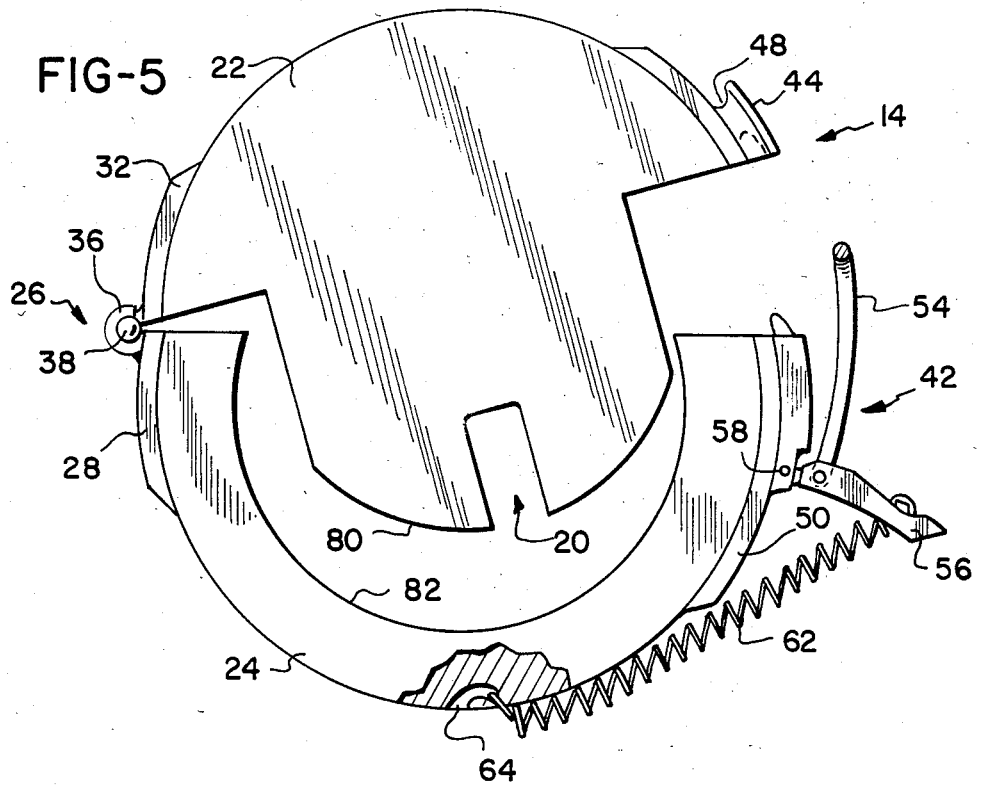
FIG. 5 is a view, similar to FIG. 4, showing the upper and lower jaw members pivoted to their open position.

A latch means 42 is provided for holding the upper and lower jaw members 22 and 24 in their closed position, such that the lengths 10 and 12 of rope or cable are compressed in the slot 20 and securely engaged. The latch means 42 includes a first latch portion 44, which is mounted on the upper jaw member 22 by means of screws 46. The first latch portion 44 defines a latch groove 48. The latch means 42 further includes a second latch portion 50 which is mounted on the lower jaw member 24 by screws 52. The second latch portion 50 includes a capture sling 54 which, as shown in FIGS. 1, 2, and 4, engages the groove 48 in the first latch portion 44 to hold the upper and lower jaw members 22 and 24 together in their closed position.

Figure 2:
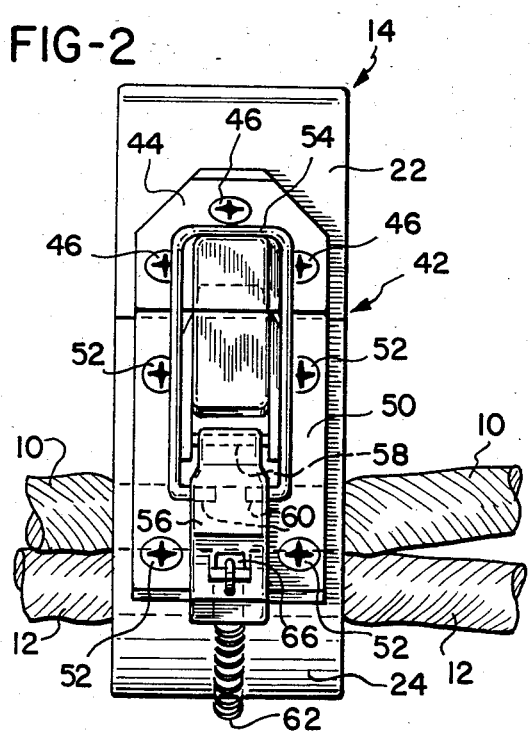
FIG. 2 is a side view taken generally along line 2—2 in FIG. 4.
Figure 3:
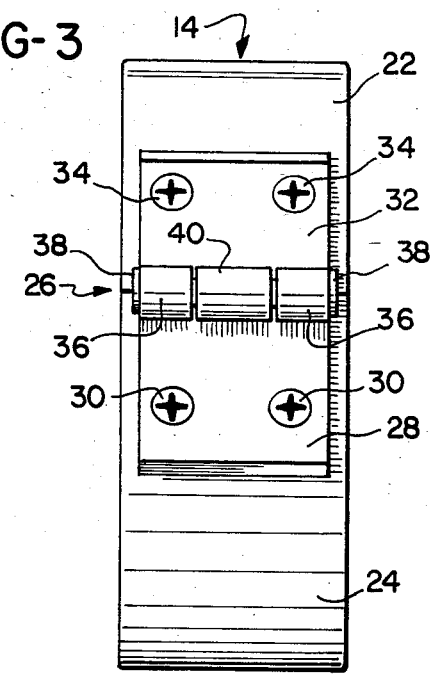
FIG. 3 is a side view taken generally along line 3—3 in FIG. 4.

The second latch portion 50 further includes lever means 56 which is pivotally mounted on the lower jaw member by pivot pin 58. The lever means 56 is pivotally attached to the capture sling 54 by the inward turned ends 60 (FIG. 2) of sling 54 which are received within corresponding holes in the sides of lever means 56. The lever means is movable between a first position, and a second position. When the lever means is in the first position, shown in FIG. 5 and, in dashed lines in FIG. 4, the capture sling 54 does not engage the latch groove 48 on the first latch portion 44. In the second position, as shown in FIGS. 1, 2, and 3 (in solid lines), the capture sling engages the latch groove 48 so as to hold together the upper and lower jaw members 22 and 24. As may be seen from the drawings, the lever means 56 in the second position is over center with respect to the capture sling 54 such that a force applied to the capture sling by the first latch portion 44 does not tend to pivot the lever 56 toward its first position. Further, in order to ensure that lever 56 remains in its first position, a coil spring 62 is connected to the lower jaw member by engagement within slot 64. The opposite end of the spring 62 is connected to the lever means 56, extending through opening 66. The coil spring 62 provides a spring force which urges the lever means 56 toward its second position.

It will be appreciated that it is desirable and indeed necessary for secure engagement of lengths of rope or cable 10 and 12 that these links be compressed within the slot 20. In order to accomplish this, it is necessary that the height of the slot 20 be less than the total of the diameters of the two lengths 10 and 12. The amount by which the height of the slot should be less than the sum of these diameters is dependent primarily upon the material of which the cable or rope lengths 10 and 12 is made. If the rope lengths are made of a very soft, compressible material, a greater amount of compression and therefore a smaller mentioned slot is desired. Similarly, if the cable lengths are made of very stiff material, it may be desirable that the height of the slot be only marginally less than twice the diameter of the rope or cable lengths.

In order to permit a single clamp device according to the present invention to be used with a range of rope or cable length diameters, a slot insert, such as insert 68, shown in FIG. 1, may be provided. The outer dimensions of the slot insert are selected such that the slot insert 68 may be received within the open ended engagement slot 20. The slot insert defines a secondary engagement slot 70 which is of a height and width less than that of the open ended engagement slot 20 so as to accommodate smaller diameter rope or cable lengths. Further, if desired, the slot insert 68 may define a plurality of teeth 72 around the secondary engagement slot 70. Teeth 72 further facilitate the gripping of the rope or cable lengths. It will be appreciated, however, that the insert 68 can be configured without such teeth. Further, the clamp device may, if desired, include teeth along the inner surface of slot 20.

An alternative slot insert 74 is also shown in FIG. 1. Insert 74 defines a secondary engagement slot 76 which varies in width to accommodate ropes or cables of differing diameter. Slot 76 is configured to receive a relatively small diameter cable or rope length above a somewhat larger diameter cable or rope length.

The clamp device of the present invention provides a simple and effective means of clamping together a pair of rope or cable lengths without the need for tools of any sort. The clamp device of the present invention, further, may be rapidly disengaged from the rope or cable lengths 10 and 12, when desired. As will be noted, the clamp is of sturdy construction. The upper jaw member 22 includes a tongue portion 78 which defines the slot 20, with the slot 20 extending inward from a first arcuate surface 80. The lower jaw member 24, on the other hand, defines a second arcuate surface 82 which is positioned in close proximity to the first arcuate surface when the upper and lower jaw members 22 and 24 are in their closed position. This sturdy construction is facilitated by placing the hinge means 26 and the latch means 42 on opposite sides of the slot.

Figure 6:
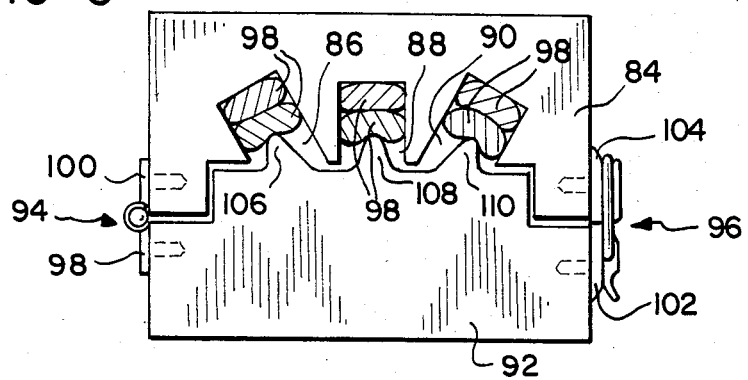
FIG. 6 is a front view of an alternative embodiment of the present invention which is capable of engaging a plurality of pairs of ropes or cables.

Reference is now made to FIG. 6 which illustrates an alternative embodiment of the clamp device of the present invention capable of clamping together multiple pairs of ropes or cables. The clamp device includes an upper jaw member 84 defining a plurality of open ended engagement slots 86, 88 and 90. The clamp device further includes a lower jaw member 92 which is attached to upper jaw member 84 by hinge means 94. A latch means 96 holds the upper and lower jaw members in the closed position, shown in FIG. 6, permitting a plurality of pairs of ropes or cables 98 to be clamped together within each such pair being positioned within a respective one of the slots 86, 88 and 90. The hinge means 94 and the latch means 96 are identical in construction with hinge means 26 and latch means 42 with the exception that hinge plates 98 and 100 and latch portions 102 and 104 are configured for attachment to the flat side surfaces of the clamp device, and the spring 62 (FIG. 4) may be omitted if desired. The lower jaw member 92 defines a plurality of ridges 106, 108 and 110 which bridge the open ends of slots 86, 88, and 90, respectively, when the jaws are in their closed position. The ropes or cables 98 are thereby clamped together within the slots.

It will be appreciated that numerous variations may be made to the clamp device within the scope of the present invention. For example, the hinge means 26 or 94 may be omitted from the clamp device and a second latch means attached to the upper and lower jaw members in its place. Additionally, any number of slots and corresponding ridges may be utilized in the embodiment of FIG. 6.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A clamp device for clamping together cables or ropes, comprising:
   an upper jaw member having a tongue portion with a first arcuate surface at an end thereof, said tongue portion defining an open ended engagement slot extending inwardly from said first arcuate surface,
   a lower jaw member defining a second arcuate surface,
   hinge means, attaching together said upper jaw member and said lower jaw member, said hinge means permitting said upper and lower jaw members to be pivoted apart to an open position such that the end of said slot is open and ropes or cables may be inserted thereinto, and permitting said upper and lower jaw members to be pivoted together to a closed position such that said first and second arcuate surfaces are in close proximity, and such that the end of said slot is bridged by said lower jaw member thereby retaining ropes or cables in said slot, and
   latch means for holding said upper and lower jaw members in said closed position, whereby a plurality of ropes or cables may be clamped together within said slot.

2. The clamp device of claim 1 in which said hinge means and said latch means are on opposite sides of said slot.

3. The clamp device of claim 1 in which said latch means comprises:
   a first latch portion on said upper jaw member, said first latch portion defining a latch groove, and
   a second latch portion on said lower jaw member, said second latch portion including a capture sling for engaging said groove to hold said upper and lower jaw members together in said closed position.

4. The clamp device of claim 3 in which said second latch portion further comprises:
   lever means pivotally mounted on said lower jaw member and pivotally attached to said capture sling, said lever means being movable between a first position in which said capture sling does not engage said latch groove on said first latch portion, and a second position in which said capture sling may engage said latch groove, said lever means in said second position being over-center with respect to said capture sling such that a force applied to said capture sling by said first latch portion does not tend to pivot said lever means toward its first position, and
   spring means, connected to said lower jaw member and to said lever means, for urging said lever means toward its second position.

5. The clamp device of claim 1 further comprising a slot insert dimensioned to be received within said open ended engagement slot, said slot insert defining a secondary engagement slot of a height and width less than that of said open ended engagement slot.

6. The clamp device of claim 5 in which said slot insert defines a plurality of teeth around said secondary engagement slot.

7. The clamp device of claim 5 in which said secondary engagement slot varies in width to accommodate ropes or cables of differing diameter.

8. The clamp device of claim 1 in which said upper jaw member defines a plurality of open ended engagement slots.

9. The clamp device of claim 8 in which said lower jaw member defines a plurality of ridges, each of which bridges the open end of a respective one of said plurality of slots when said jaw members are in said closed position.

10. A rope or cable connection, comprising,
    first and second lengths of cable or rope, and
    a clamp device, clamping together said first and second lengths of cable or rope, said clamp device including:
    an upper jaw member having a tongue portion with a first arcuate surface at an end thereof, said tongue portion defining an open ended engagement slot extending inwardly from said first arcuate surface, through which said lengths of cable or rope extend, said slot having a width slightly less than the diameter of said lengths of cable or rope and a height slightly less than twice the diameter of said lengths of cable or rope,
    a lower jaw member defining a second arcuate surface,
    hinge means attaching together said upper and lower jaw members such that said jaw members may be pivoted apart to an open position or pivoted together to a closed position in which said first and second arcuate surfaces are in close proximity, and the open end of said slot is bridged by said lower jaw member, and
    latch means for holding said upper and lower jaw members in said closed position, whereby said ropes or cables are compressed in said slot and engaged thereby.

11. The connection of claim 10 in which said upper jaw member defines a plurality of teeth around said slot.

12. The connection of claim 10 in which said hinge means and said latch means are on opposite sides of said slot.

13. The connection of claim 10 in which said latch means comprises:
    a first latch portion on said upper jaw member, said first latch portion defining a latch groove, and
    a second latch portion on said lower jaw member, said second latch portion including a capture sling for engaging said groove to hold said upper and lower jaw members together in said closed position.

14. The connection of claim 13 in which said second latch portion further comprises:
    lever means pivotally mounted on said lower jaw member and pivotally attached to said capture sling, said lever means being movable between a first position in which said capture sling does not engage said latch groove on said first latch portion, and a second position in which said capture sling may engage said latch groove, said lever means in said second position being over-center with respect to said capture sling such that a force applied to said capture sling by said first latch portion does not tend to pivot said lever toward its first position, and spring means, connected to said lower jaw member and to said lever means, for urging said lever means toward its second position.

15. A clamp device for clamping together cables or ropes, comprising:

an upper jaw member defining a primary, open ended transverse slot therethrough, a lower jaw member, hinge means, attaching together said upper jaw member and said lower jaw member, said hinge means permitting said upper and lower jaw members to be pivoted apart to an open position such that said open end of said primary slot may receive ropes or cables therein such that said ropes or cables extend therethrough, and permitting said upper and lower jaw members to be pivoted together to a closed position such that said open end is bridged by said lower jaw member thereby retaining and clamping ropes or cables in said primary slot, latch means for holding said upper and lower jaw members in said closed position, such that a plurality of ropes or cables extending through said slot are clamped together, and an insert sized to fit within said primary slot and being removable therefrom, said insert having a secondary, open ended transverse slot therethrough of smaller dimension than said primary slot, such that ropes or cables of a smaller diameter may be clamped by said device.

16. The clamp device of claim 15 wherein said slot insert includes a plurality of teeth extending about a periphery of said secondary slot in position to engage and grip a rope or cable clamped therein.

17. The clamp device of claim 15 wherein said secondary slot varies in width to accomodate ropes or cables of differing diameters.

* * * * *